(12) United States Patent
Mahakul et al.

(10) Patent No.: US 7,370,627 B2
(45) Date of Patent: May 13, 2008

(54) OPTIMIZED LOW EMISSION TWO-STROKE INTERNAL COMBUSTION DIESEL ENGINE

(75) Inventors: Budhadeb Mahakul, Naperville, IL (US); Kenneth M. Sinko, Oak Park, IL (US); Rafiqul Islam, Naperville, IL (US); Chih L. Liu, Naperville, IL (US); Frank M. Graczyk, Darien, IL (US); Brent J. Valesano, Des Plaines, IL (US); Randal K. Albright, Oswego, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 0 days.

(21) Appl. No.: 11/010,682

(22) Filed: Dec. 13, 2004

(65) Prior Publication Data

US 2005/0188944 A1   Sep. 1, 2005

Related U.S. Application Data

(60) Provisional application No. 60/551,569, filed on Mar. 9, 2004, provisional application No. 60/548,952, filed on Mar. 1, 2004.

(51) Int. Cl.
*F02F 3/26* (2006.01)
(52) U.S. Cl. .................................. 123/276; 123/193.6
(58) Field of Classification Search .............. 123/276, 123/279, 307, 193.6, 467, 298; 239/533.12
See application file for complete search history.

(56) References Cited

U.S. PATENT DOCUMENTS

| | | | |
|---|---|---|---|
| 4,955,338 A | 9/1990 | Diwakar et al. | |
| 5,000,144 A | 3/1991 | Schweinzer et al. | |
| 5,555,867 A | 9/1996 | Freen | |
| 5,868,112 A | 2/1999 | Mahakul et al. | |
| 5,954,038 A | 9/1999 | Warwick et al. | |
| 6,318,308 B1 | 11/2001 | Hsu et al. | |
| 6,491,016 B1 | 12/2002 | Buratti | |
| 6,513,487 B1 | 2/2003 | Jorach et al. | |
| 6,637,402 B2 * | 10/2003 | Liu | 123/279 |
| 6,694,957 B2 | 2/2004 | Schueler et al. | 123/572 |
| 6,732,703 B2 * | 5/2004 | Eckerle et al. | 123/298 |
| 6,840,209 B2 | 1/2005 | Shimazaki | |
| 6,862,976 B2 * | 3/2005 | Gaiser et al. | 92/186 |

(Continued)

OTHER PUBLICATIONS

U.S. Appl. No. 11/039,650 filed Jan. 20, 2005 by General Motors Corporation.

(Continued)

*Primary Examiner*—Hai Huynh
(74) *Attorney, Agent, or Firm*—Cook, Alex, McFarron, Manzo, Cummings & Mehler, Ltd.

(57) ABSTRACT

An optimized two-stroke internal combustion diesel engine, suitable for locomotive applications, has been developed to meet the EPA locomotive Tier 2 emission standards. To achieve a low emission target below the EPA Tier 2 standards for $NO_x$ (5.5 g/bhp-hr) and particulates (0.2 g/bhp-hr), several innovative changes have been made to the engine. These changes include: a new piston bowl geometry; low oil consumption piston rings; optimized surface finish cylinder liner; optimized fuel injection camlobe; modified fuel injector nozzle; new efficient aftercooler; optimized oil separator; and optimized turbocharger.

17 Claims, 7 Drawing Sheets

U.S. PATENT DOCUMENTS

| | | | |
|---|---|---|---|
| 6,868,817 B2* | 3/2005 | Liu | 123/193.6 |
| 6,945,210 B2* | 9/2005 | Liu | 123/193.4 |
| 6,955,165 B2* | 10/2005 | Liu | 123/663 |
| 7,025,031 B2* | 4/2006 | Mahakul et al. | 123/193.6 |
| 2004/0182358 A1* | 9/2004 | Eckerle et al. | 123/276 |
| 2005/0172926 A1* | 8/2005 | Poola et al. | 123/193.6 |
| 2006/0150955 A1* | 7/2006 | Mahakul et al. | 123/508 |

OTHER PUBLICATIONS

"The Influence of Swirl on the Fresh Charge Stratification in an IC Engine Combustion Chamber" by T. Uzkan and J.R. Hazelton, SAE Paper No. 860466, SAE, Warrendale, PA 15096. Dated: Feb. 1986.

"Three-Dimensional Modeling of the In-Cylinder Gas Exchange Processes in a Uniflow-Scavanged Two-Stroke Engine" by R. Diwaker, SAE Paper No. 870596, SAE, Warrendale, PA 15096. Dated: Feb. 1987.

"Analytically Predicted Improvements in the Scavenging and Trapping Efficiency of Two-Cycle Engines" by T. Uzkan, SAE Paper No. 880108, SAE, Warrendale, PA 15096. Dated: Feb. 1988.

"The Effects of Piston Bowl Shape Modifications on the In-Cylinder Flow Characteristics of the EMD 710 Engine", by T. Uzkan, T.J. Savage and J.R. Hazelton, SME Paper No. 85-DGP-23, SME, NY, NY, 10017. Dated Feb. 1985.

"Electrically Controlled Injection Rate Shaping for Medium Speed Diesel Engines" International Council on Combustion Engines, 2001 Congress, Hamburg, Germany.

* cited by examiner

OPTIMIZED LOW EMISSION TWO-STROKE INTERNAL COMBUSTION DIESEL ENGINE

CROSS-REFERENCE TO RELATED APPLICATIONS

The present patent application is a non-provisional application claiming benefit under 35 U.S.C. § 119(e) of U.S. provisional patent application Ser. No. 60/548,952, filed on Mar. 1, 2004 and U.S. provisional patent application Ser. No. 60/551,569, filed on Mar. 9, 2004.

TECHNICAL FIELD

The present invention relates to a collective of optimization aspects for internal combustion engines, particularly two-stroke diesel engines used for a number of different applications, as for a non-limiting example, locomotive applications.

BACKGROUND OF THE INVENTION

The U.S. Environmental Protection Agency (EPA) has promulgated standards which require locomotive manufacturers to comply after Jan. 1, 2005 with "Tier 2" emissions standards. As a result, there is a need to achieve about a 50% reduction in particulate emissions along with about a 30% reduction in $NO_x$ (nitrogen oxides) emissions for locomotive two-stroke internal combustion diesel engines, dictating need for engine optimization.

Accordingly, what remains needed in the art is an optimized two-stroke internal combustion diesel engine, suitable for locomotive (as well as other) applications, which meets EPA Tier 2 emissions standards.

SUMMARY OF THE INVENTION

An optimized two-stroke internal combustion diesel engine, suitable for locomotive, marine, power generation, and a variety of industrial applications, as for example the General Motors Corporation 710 and 645 Series engines, has been developed according to the present invention in order to meet the EPA locomotive Tier 2 emissions standards, as well as a number of other governmental standards.

To achieve a low emission target below the EPA Tier 2 standards for $NO_x$ (5.5 g/bhp-hr) and for particulates (0.2 g/bhp-hr), several innovative changes have been made to the engine. These changes include: a new piston bowl geometry; low oil consumption piston rings; optimized surface finish cylinder liner; optimized fuel injection camlobe; modified fuel injector nozzle; new efficient aftercooler; optimized oil separator; and optimized turbocharger.

Modifications to the combustion chamber geometry, along with an optimized fuel injector, provide clean combustion. The new, efficient aftercooler has resulted in a significant drop in airbox (intake manifold) temperature that has resulted in lowering of $NO_x$ emissions. The particulate reduction has been achieved through a superior combustion system along with an optimized cylinder liner and piston ring geometry. A new piston bowl geometry matched with a new injector nozzle configuration, provides a beneficial reduction in particulate and smoke emissions. An optimized surface finish of the cylinder liner reduces the lube oil consumption, along with reducing cylinder liner wear. The optimized piston rings provide further reduction in oil consumption and particulate emissions.

Further improvements in particulate emissions reduction have been achieved by incorporating a highly efficient crankcase ventilation system. Also, improvements have been made to the aftercooler configuration that enable lowering airbox temperature by 15% and resulting in significantly lowered $NO_x$ emissions.

Accordingly, it is an object of the present invention to provide an optimized two-stroke internal combustion diesel engine suitable for use in locomotive (as well as other) applications, which meets EPA Tier 2 emissions standards.

This and additional objects, features and advantages of the present invention will become clearer from the following specification of a preferred embodiment.

DESCRIPTION OF THE PREFERRED EMBODIMENT

Referring now to the drawings, FIGS. 1 through 9 depict various aspects of optimization of a two-stroke internal combustion diesel engine, as for example the General Motors Corporation 710 and 645 Series engines, according to the present invention.

Figure 1:
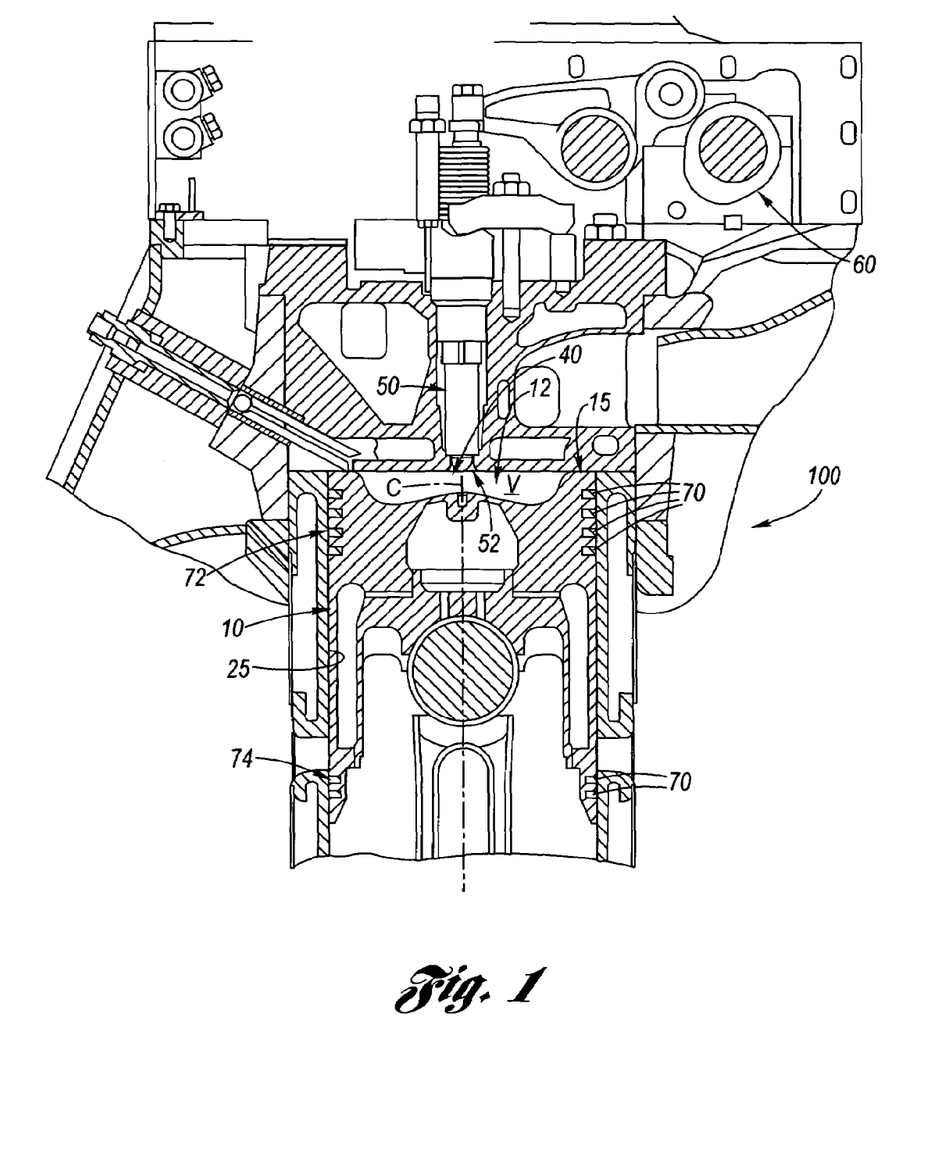
FIGS. 1 and 1A are schematic, partly cut-away, cross-sectional views of an optimized two-stroke internal combustion diesel engine according to the present invention.
Figure 1A:
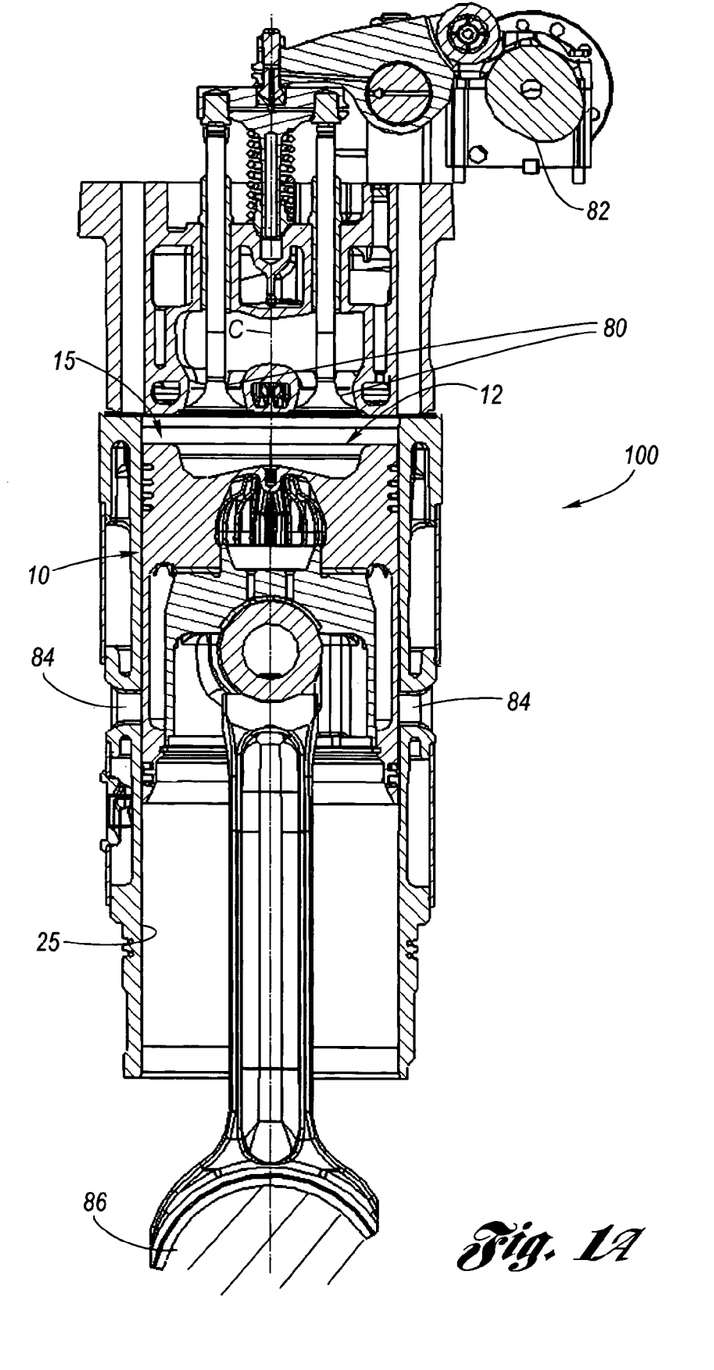

FIGS. 1 and 1A show a schematic views of an optimized two-stroke diesel engine 100 having a piston 10 reciprocal within a cylinder liner 25, wherein the piston has a piston bowl 12 formed in the piston crown 15 thereof and concentrically disposed about a centerline C of the piston, according to the present invention.

Figure 2:
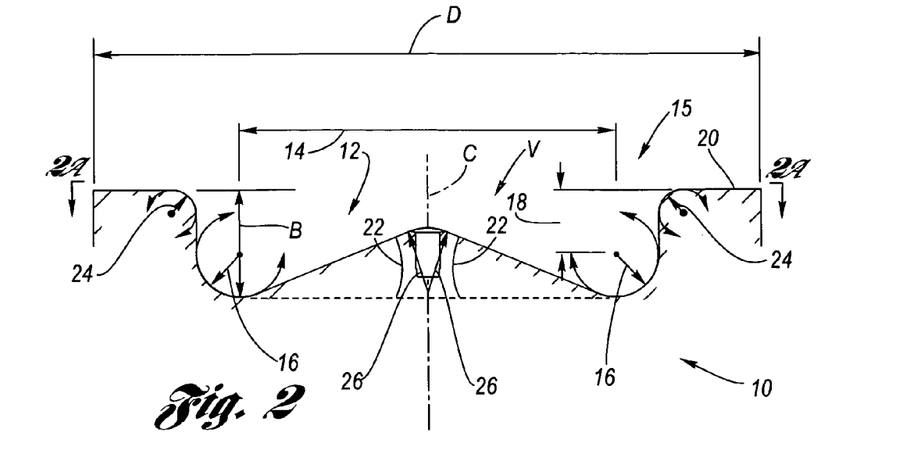
FIG. 2 is a partly cut-away, sectional view of a piston crown showing piston bowl geometry according to the present invention.
Figure 2A:
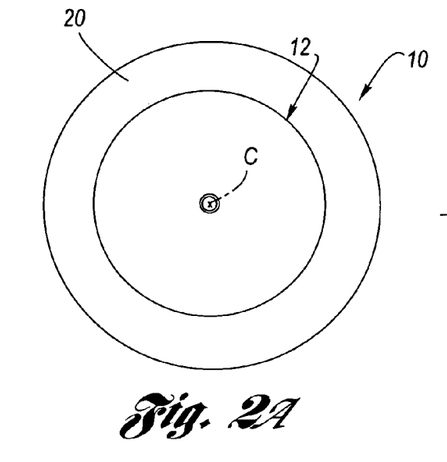
FIG. 2A is a top plan view, seen along line 2A-2A of FIG. 2.

As can be best understood by reference to FIGS. 2 and 2A, the shape of the piston bowl 12 is one of several key design changes made to meet U.S. EPA Tier 2 locomotive emissions standards. This accomplishment was achieved through a specific combination of critical characteristics, including: a toroidal major diameter 14 preferably equal to 4.960 inches, plus or minus 0.020 inches; a toroidal minor radius 16 preferably equal to 0.650 inches, plus or minus 0.020 inches; a toroidal submersion 18 below the squish land 20 preferably equal to 0.745 inches, plus or minus 0.020 inches; a center cone angle 22 preferably equal to twenty-two and one-half degrees, plus or minus one degree; a crown rim radius 24 preferably equal to 0.38 inches; a center spherical radius 26 preferably equal to 0.75 inches, and a piston bowl volume V of, for reference purposes only, preferably equal to 35.45 cubic inches, plus or minus one cubic inch.

Of additional note is the ratio of the toroidal major diameter 14 and the toroidal minor radius 16 relative to the piston diameter D, wherein the piston diameter is preferably equal to 9.055 inches, the ratio of piston bowl depth B to the piston diameter D, wherein the piston bowl depth is preferably equal to 1.395 inches, plus or minus 0.040 inches, and the center spherical radius 26, center cone angle 22, and crown rim radius 24.

In this regard, it should be noted that the piston bowl 12 and piston crown 15 shown in FIGS. 2 and 2A are substantially to scale in accord with the dimensions hereinabove recited, and the piston crown and piston bowl shown in FIGS. 1 and 1A are merely schematically depicted (not necessarily to scale with the aforementioned dimensions).

A unique feature of the above stated piston bowl characteristics is the ability to retard engine injection timing to lower emissions while meeting the smoke criterion and optimization of fuel economy. By optimizing the critical dimensions of the piston bowl geometry, it has been possible to meet U.S. EPA Tier 2 locomotive engine emissions standards and simultaneously maintain fuel efficiency.

Reduction in particulate emission has been realized by optimizing the combustion chamber geometry along with an optimized fuel injector nozzle configuration.

Figure 3:
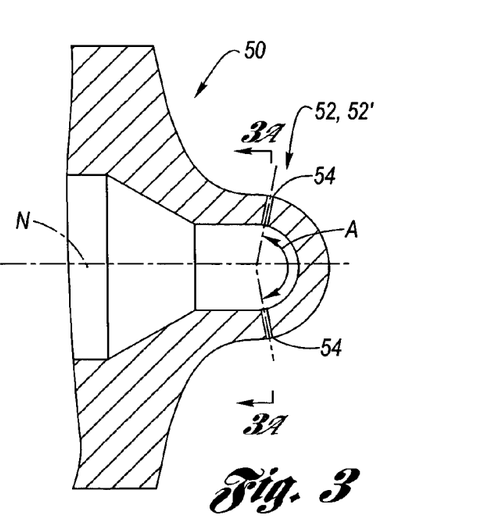
FIG. 3 is a detail, partly cut-away sectional side view of a fuel injector nozzle according to the present invention.
Figure 3A:
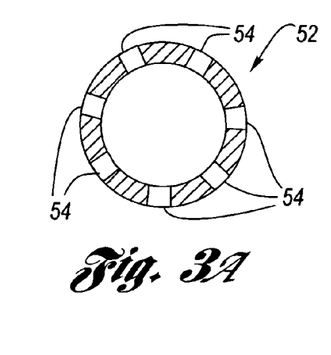
FIG. 3A is a sectional view of a first preferred embodiment of the fuel injector nozzle of FIG. 3, taken along line 3A-3A of FIG. 3.
Figure 3B:
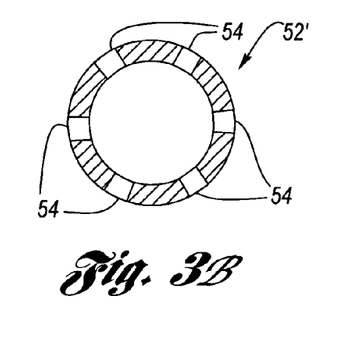
FIG. 3B is a sectional view of a second preferred embodiment of the fuel injector nozzle of FIG. 3 taken also along line 3A-3A of FIG. 3.

As shown additionally by FIGS. 3 through 3B, the geometry of a fuel injector nozzle has been optimized by modification of an electronic fuel injector original part number 40112393 (used unit exchange part number 40112394) supplied by Robert Bosch GmbH of Kentwood, Mich. The fuel injector 50 (see also FIG. 1) has an optimized fuel injector nozzle body 52, 52' having six or seven (in other words, at least six and less than eight), fuel injection holes 54, in this regard FIG. 3A depicts seven fuel injection holes, which is most preferred, and FIG. 3B depicts six fuel injection holes. The fuel injection holes 54 are of mutually equal size and are equidistantly spaced concentrically around a nozzle centerline N. Each of the fuel injection holes 54 is provided with a reduced (as compared to that used by conventional fuel injectors) diameter hole size, the hole diameter being within the range of between preferably 0.0133 inches and 0.0152 inches, which thereby reduces fuel flow rate through the injector by between about 3% and 7% (as compared to conventional fuel injectors). The included angle A of the fuel injection holes 54 is preferably 150 degrees, plus or minus 2 degrees. The reduced diameter hole size provides reduction in the fuel injection rate along with an increase in fuel injection duration of between about 3% and 8% (as compared with conventional fuel injectors) and a rise in peak fuel injection pressure within the range of between about 6% and 12% (as compared to conventional fuel injectors), and serves to lower the $NO_x$ formation during the fuel combustion process, as well as to lower smoke and particulate levels.

Additionally according to the present invention, the position of the fuel camlobes 60 (see FIG. 1) has been optimized for the optimized two-stroke diesel engine 100 to ensure that the fuel injection event occurs at the optimum position (orientation) of the camlobes with respect to the engine crankshaft. The fuel camlobes 60 have been repositioned by a further 4 degrees, plus or minus 2 degrees than the position used for the fuel camlobes of a diesel engine compliant with the current Tier 1 emissions standard.

It will be understood with particular reference now to FIG. 1A, that in operation of the optimized two-stroke diesel engine 100, a pair of exhaust valves 80 are operated by an exhaust valve cam 82 connected with the engine crankshaft 86 wherein the exhaust valve cam operates responsive to rotation of the crankshaft, and that the intake ports 84 are accessed as the piston crown 15 passes therebelow during reciprocation of the piston 10.

Figure 4:
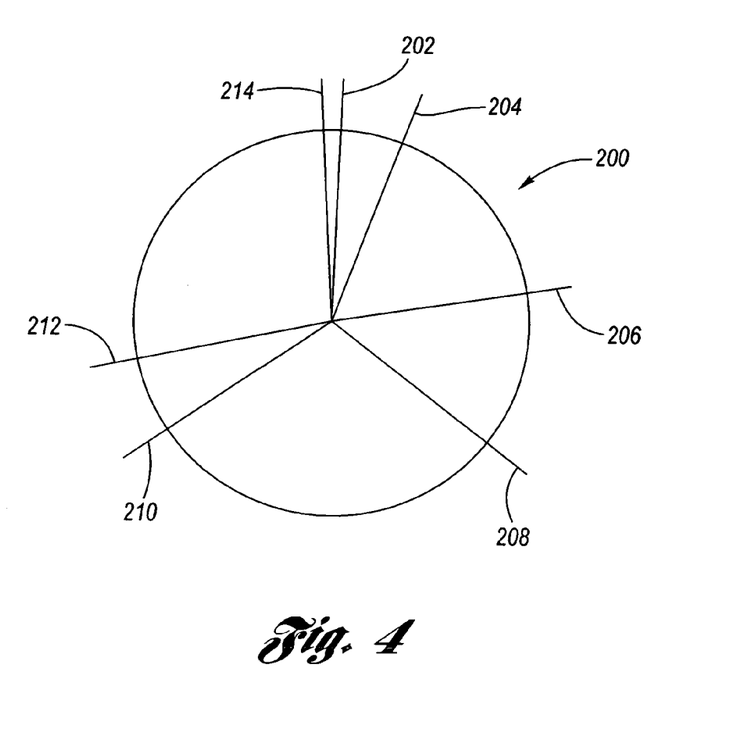
FIG. 4 is a crank timing chart for the optimized two-stroke diesel engine of FIGS. 1 and 1A according to the present invention.
Figure 5:
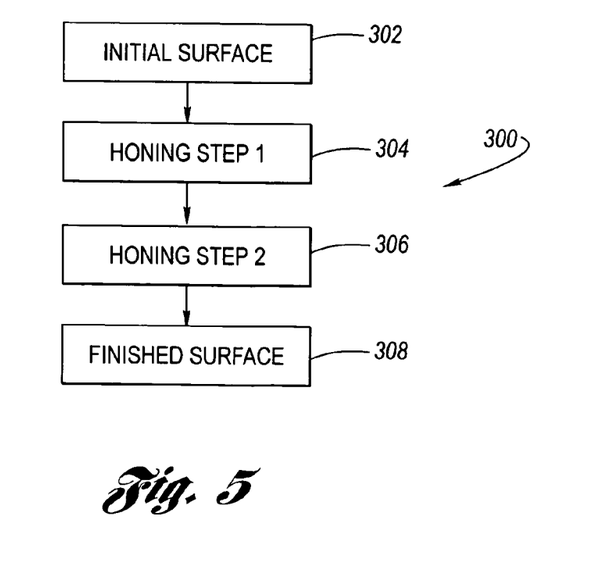
FIG. 5 is a flow chart of surface honing steps for surface finishing according to the present invention.
Figure 6:
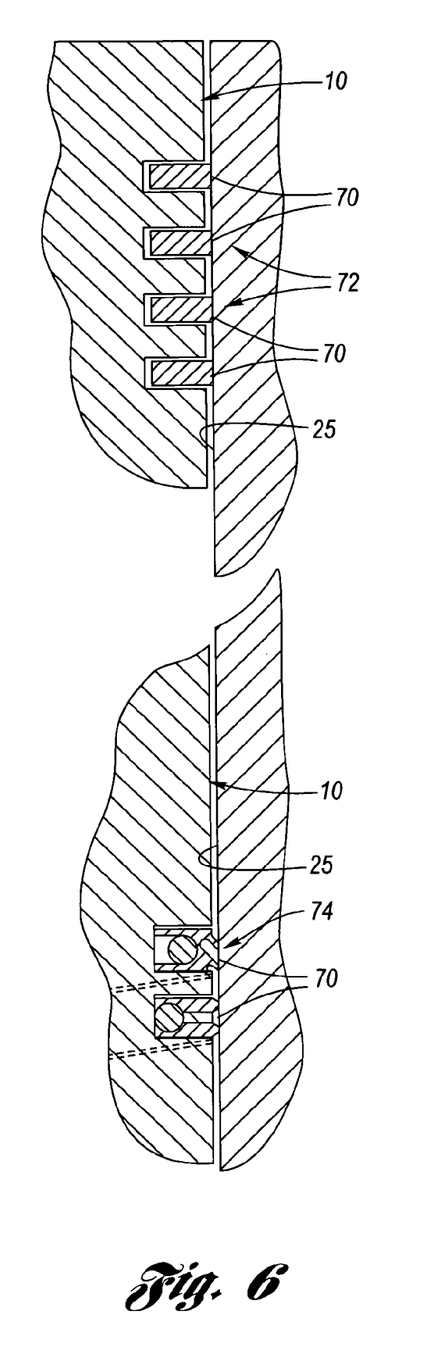
FIG. 6 is a broken-away, detail sectional view of the piston and cylinder liner of the optimized two-stroke diesel engine of FIGS. 1 and 1A, showing in particular piston rings therefor.

This new fuel camlobe positioning can be understood by the crank timing chart 200 of FIG. 4. Piston top dead center 202 is at 0 degrees. End of fuel injection 204 is at 20 degrees after (that is, clockwise in relation to) piston top dead center, plus or minus 2 degrees. The engine exhaust valves open 206 at 79 degrees after piston top dead center, plus or minus 2 degrees. The engine intake ports open 208 at 125 degrees after piston top dead center, plus or minus 2 degrees. The engine intake ports close 210 at 235 degrees after piston top dead center, plus or minus 2 degrees. The engine exhaust valves close 212 at 257 degrees after piston top dead center, plus or minus 2 degrees. Finally, beginning of fuel injection 214 is at 4 degrees before (that is counterclockwise in relation to) piston top dead center, plus or minus 2 degrees.

Still further according to the present invention, effective and appropriate lube oil retention on the cylinder liner bore wall 25 (see FIG. 1) is required to minimize its impact on oil consumption and particulate emissions levels, while providing and maintaining an adequate oil film thickness at the sliding interface between the piston ring faces and the cylinder liner bore. This key requirement is dependent on a number of cylinder liner characteristics. One primary cylinder liner characteristic affecting lube oil retention is the cylinder liner bore finish, which is traditionally achieved by single-step honing.

Bore finish characteristics and criteria for the optimized two-stroke diesel engine according to the present invention are distinct and unique as compared to those for equivalent prior standard production cylinder liners. These distinctions are attributable to an innovative change to the honing procedure from a single-step finish process to a two-step finish process 300, shown at FIG. 5. This innovative change to the honing procedure, begins with an initial rough surface 302, then uses a first pass honing step 304 according to the present invention to provide a comparatively rough, preferably between 50 and 90 micro-inch $R_a$ surface with preferably between a 20 degree and a 50 degree angular lay (whereas, by comparison, the conventional single-step honing operation in the previously established process is employed to completely generate the appropriate finished surface). An additional second pass honing step 306 according to the present invention is then employed to modify only the immediate top layer of this initial surface as provided by the first step 304, to thereby reduce the initial roughness to preferably between 20 and 45 micro-inch $R_a$ to thereby provide a finished surface 308.

Choice of piston rings 70 and their interface with the piston 10 and the cylinder liner 25 is critical for minimization of oil loss into the combustion chamber 40 (see FIG. 1) and minimization of combustion gas blow-by out of the combustion chamber vis-a-vis the piston 10 with respect to the cylinder liner 25. As can be discerned from FIGS. 1 and 6, the piston rings 70 comprise an upper ring set (or ring pack) 72 of four rings mainly having the function of minimizing combustion gas blow-by, and a lower ring set (or ring pack) 74 of two rings mainly having the function of minimizing oil loss. The combination of piston rings 70 and the aforedescribed two step finish process 300 for the cylinder liner 25 provide significant improvement in terms of oil consumption and particulate emission for the optimized two-stroke diesel engine 100. The preferred piston rings are supplied by Federal-Mogul Friedburg GmbH of Friedberg, Germany, wherein the part numbers are (in order of increasing distance from the piston crown): 40109954 for the top ring, 40109955 for the second ring, 40109955 for the third ring, 40109956 for the fourth rings, 40109957 for the fifth ring, and 40109958 for the sixth ring, which piston rings 70 are optimized to improve oil consumption by about 30 to 50%.

Figure 7:
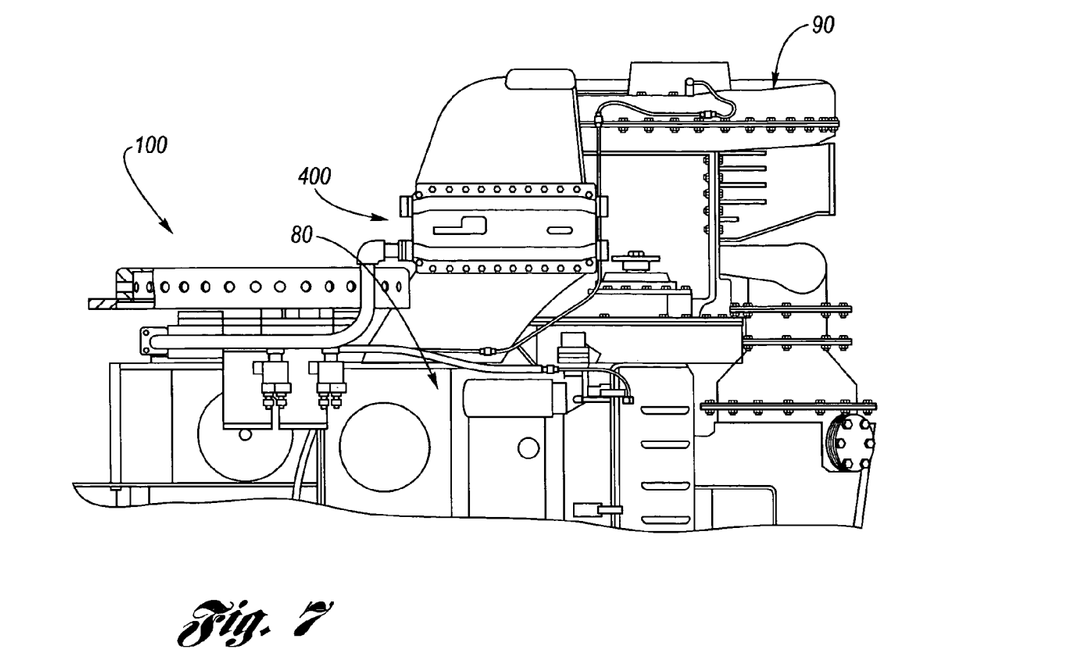
FIG. 7 is a broken away view of the optimized two-stroke diesel engine of FIGS. 1 and 1A, now showing an aftercooler and turbocharger therefor.
Figure 8:
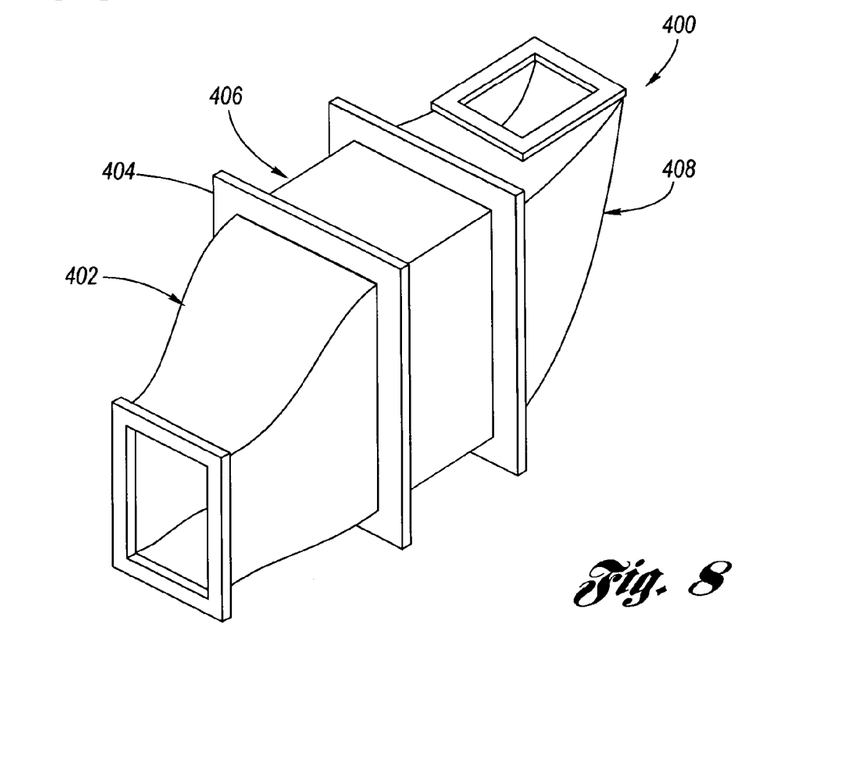
FIG. 8 is a perspective view of the aftercooler of FIG. 7.

The optimized two-stroke diesel engine 100, as shown at FIG. 7, includes an airbox (intake manifold) 80, a turbocharger 90, and an aftercooler 400 between the airbox and the turbocharger. Referring now additionally to FIG. 8, an airbox inlet section 402 connects to the airbox 80, wherein a flanged joint 404 allows for adaptation for multiple connections. A charge air heat exchanger section 406 includes a water manifold with a blocked air by-pass on the air side configured to improve air flow through the heat exchanger. A turbocharger discharge section 408 connects to the turbocharger 90. The aftercooler 400 lowers the airbox temperature by about 15%. The new aftercooler 400 has been designed to reduce the amount of bypass air along with an adaptable inlet duct that provides improved airflow. The enhanced aftercooling provides reduction in $NO_x$ without sacrificing fuel consumption.

Figure 9:
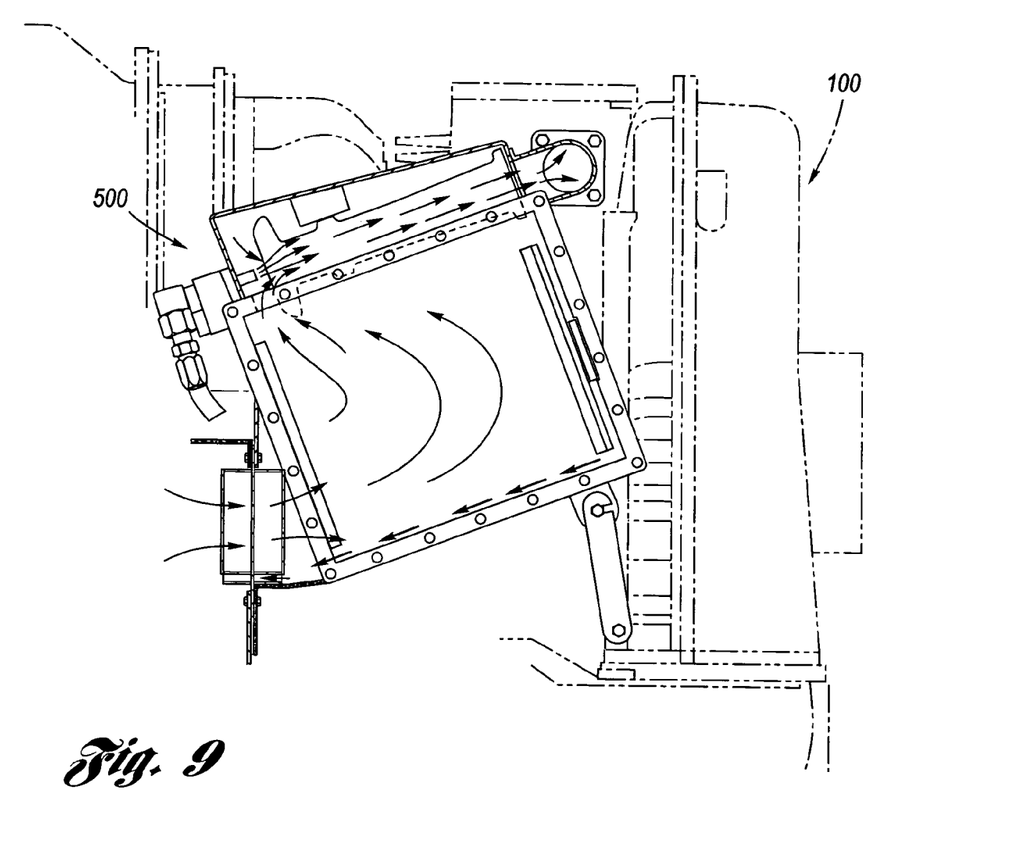
FIG. 9 is a partly sectional side view of an optimized oil separator of the optimized two-stroke diesel engine of FIGS. 1 and 1A.

Yet further, the optimized two-stroke internal combustion engine 100 includes an optimized oil separator 500, as shown at FIG. 9. The preferred optimized oil separator 500 is disclosed in U.S. Pat. No. 6,694,957 B2, issued to the assignee hereof on Feb. 24, 2004, the disclosure of which is hereby herein incorporated by reference. U.S. Pat. No. 6,694,957 B2 discloses a multi-orifice crankcase air evacuator assembly for a diesel engine which provides improved efficiency and effectiveness of crankcase air removal into the exhaust port of the engine. A multi-orifice nozzle preferably has five nozzle orifices arranged in an "X" pattern. The evacuation tube has a tube body defining a central passage and a bell-mouth concentrically disposed at its inlet. The central passage includes an air mixer and an air diffuser. Operatively, compressed air pressurably effuses from the nozzle orifices into the central passage, whereupon a low pressure region is established surrounding the bell-mouth which causes crankcase air to be sucked into the evacuator tube and thereupon be expelled to an exhaust port.

Finally according to the present invention, the ENDEC electronic controller has been programmed to provide appropriate injection timing to comply with emission standards. Modifications to the controller include changes in the fueling table, along with injection timing at predefined engine speed and load.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. An optimized two-stroke internal combustion diesel engine, comprising:
   a fuel injector having a fuel injector nozzle body having at least six and less than eight fuel injection holes, said fuel injection holes being disposed substantially equidistantly around a centerline of said fuel injector nozzle body, each said fuel injector hole having a diameter of substantially between 0.0133 inches and 0.0152 inches; wherein said fuel injection holes are oriented at an included angle with respect to said centerline of substantially between 148 degrees and 152 degrees, and
   at least one piston, each said piston comprising a piston crown comprising a piston bowl and a squish land which circumscribes said piston bowl, said piston bowl having a substantially flat floor section and comprising:
   a toroidal major diameter of substantially between 4.980 inches and 4.940 inches;
   a toroidal minor radius of substantially between 0.670 inches and 0.630 inches;
   a toroidal submersion below said squish land of substantially between 0.765 inches and 0.725 inches;
   a center cone angle of substantially between twenty-three and one-half degrees and twenty-one and one half degrees;
   a crown rim radius of substantially 0.38 inches; and
   a center spherical radius of substantially 0.75 inches.

2. The optimized engine of claim 1, wherein said piston bowl comprises: said toroidal major diameter being substantially 4.960 inches; said toroidal minor radius being substantially 0.650 inches; said toroidal submersion below the squish land being substantially 0.745inches; and said center cone angle being substantially twenty-two and one-half degrees.

3. The optimized engine of claim 2, wherein each said piston further comprises a piston diameter of substantially 9.055 inches; and a piston bowl depth of substantially between 1.435 inches and 1.355 inches.

4. The optimized engine of claim 1, wherein said fuel injector nozzle body has seven fuel injection holes.

5. The optimized engine of claim 1, wherein said fuel injector nozzle body has six fuel injection holes.

6. The optimized engine of claim 1, further comprising: a fuel camlobe respectively for each said fuel injector; at least one exhaust valve respectively for each said piston; at least one intake port respectively for each said piston; and a crankshaft connected to each said piston, wherein operation of said at least one exhaust valve is related to rotation of the crankshaft, and wherein said at least one fuel camlobe is positioned optimally with respect to the crankshaft so as to provide optimal fuel injection timing at the fuel injection holes of said fuel injector nozzle body; wherein timing of the engine comprises: said at least one piston having a top dead center position at 0 degrees; said at least one exhaust valve opening at substantially between 81 degrees and 77 degrees after said piston top dead center; said at least one intake port opening at substantially between 123 degrees and 127 degrees after said piston top dead center; said at least one intake port closing at substantially between 237 degrees and 233 degrees after said piston top dead center; said at least one exhaust valve closing at substantially between 259 degrees and 255 degrees after said piston top dead center; said fuel injector beginning fuel injection at between substantially 6 degrees and 2 degrees before said piston top dead center; and said fuel injector ending said fuel injection at between substantially 22 degrees and 18 degrees after said piston top dead center.

7. The optimized engine of claim 6, further comprising a cylinder liner respectively for each said piston, wherein said cylinder liner has a finished surface having between about 20 and 45 micro-inch $R_a$.

8. The optimized engine of claim 7, wherein each said piston further comprises: a first piston ring pack comprising a first set of four piston rings configured for minimizing combustion gas blow-by; and a second piston ring pack comprising a second set of two piston rings configured for minimizing oil loss; wherein said second piston ring pack is spaced further from said piston crown than said first ring pack is spaced from said piston ring.

9. The optimized engine of claim 8, further comprising: an airbox; a turbocharger; and an aftercooler connected between said airbox and said turbocharger; wherein said airbox comprises a charge air heat exchanger section having a water manifold with a blocked air by-pass at an air side thereof.

10. The optimized engine of claim 9, further comprising an optimized oil separator connected to a crankcase of said engine, said evacuator assembly comprising a multi-orifice nozzle and adjacent evacuator tube.

11. The optimized engine of claim 10, wherein said piston bowl comprises: said toroidal major diameter being substantially 4.960 inches; said toroidal minor radius being substantially 0.650 inches; said toroidal submersion below the squish land being substantially 0.745 inches; and said center cone angle being substantially twenty-two and one-half degrees.

12. The optimized engine of claim 11, wherein each said piston further comprises a piston diameter of substantially 9.055 inches; and a piston bowl depth of substantially between 1.435 inches and 1.355 inches.

13. The optimized engine of claim 12, wherein said fuel injector nozzle body has seven fuel injection holes.

14. The optimized engine of claim 12, wherein said fuel injector nozzle body has six fuel injection holes.

15. A piston for use in an internal combustion diesel engine including a fuel injector having a fuel injector nozzle body having at least six and less than eight fuel injection holes, said fuel injection holes being disposed substantially equidistantly around a centerline of said fuel injector nozzle body, each said fuel injector hole having a diameter of substantially between 0.0133 inches and 0.0152 inches; wherein said fuel injection holes are oriented at an included angle with respect to said centerline of substantially between 148 degrees and 152 degrees, said piston comprising:

a piston crown comprising a piston bowl and a squish land which circumscribes said piston bowl, said piston bowl having a substantially flat floor section and comprising:

a toroidal major diameter of substantially between 4.980 inches and 4.940 inches;

a toroidal minor radius of substantially between 0.670 inches and 0.630 inches;

a toroidal submersion below said squish land of substantially between 0.765 inches and 0.725 inches;

a center cone angle of substantially between twenty-three and one-half degrees and twenty-one and one half degrees;

a crown rim radius of substantially 0.38 inches; and a center spherical radius of substantially 0.75 inches.

16. The piston of claim 15, wherein said piston bowl further comprises: said toroidal major diameter being substantially 4.960 inches; said toroidal minor radius being substantially 0.650 inches; said toroidal submersion below the squish land being substantially 0.745 inches; and said center cone angle being substantially twenty-two and one-half degrees.

17. The piston of claim 16, further comprising a piston diameter of substantially 9.055 inches; and a piston bowl depth of substantially between 1.435 inches and 1.355 inches.

\* \* \* \* \*